United States Patent
Sagebrand et al.

(10) Patent No.: US 9,992,749 B2
(45) Date of Patent: Jun. 5, 2018

(54) FIRST NODE AND METHODS THEREIN FOR CONTROLLING A TRANSMISSION POWER OF A SECOND NODE

(71) Applicant: TELEFONAKTIEBOLAGET LM ERICSSON (PUBL), Stockholm (SE)

(72) Inventors: Birgitta Sagebrand, Linköping (SE); Ulf Händel, Norsholm (SE); Björn Hofström, Linköping (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/521,412

(22) PCT Filed: Oct. 30, 2014

(86) PCT No.: PCT/SE2014/051281
§ 371 (c)(1),
(2) Date: Apr. 24, 2017

(87) PCT Pub. No.: WO2016/068765
PCT Pub. Date: May 6, 2016

(65) Prior Publication Data
US 2017/0318545 A1    Nov. 2, 2017

(51) Int. Cl.
  *H04B 7/00*    (2006.01)
  *H04W 52/24*    (2009.01)
  *H04W 52/14*    (2009.01)

(52) U.S. Cl.
  CPC ........ *H04W 52/241* (2013.01); *H04W 52/146* (2013.01)

(58) Field of Classification Search
  USPC .......................................... 455/522, 69–70
  See application file for complete search history.

(56) References Cited

U.S. PATENT DOCUMENTS

2004/0248568 A1*   12/2004   Lucidarme ................ H04L 1/20
                                                           455/423
2010/0120464 A1*   5/2010   Bjorken ................ H04L 1/0003
                                                           455/522

(Continued)

FOREIGN PATENT DOCUMENTS

EP     1296464 A1    3/2003
WO   2005034381 A1   4/2005

OTHER PUBLICATIONS

3GPP, "3rd Generation Partnership Project; Technical Specification Group GSM/EDGE Radio Access Network; Radio subsystem link control (Release 12)," 3GPP TS 45.008 V12.3.0, Feb. 2014.

(Continued)

*Primary Examiner* — Fayyaz Alam
(74) *Attorney, Agent, or Firm* — Sage Patent Group (57) ABSTRACT

Method by a first node of controlling power of a second node. The first node determines whether a measurement report, MR, has been received from a third node. The MR comprises a first type of information, related to a channel between the third and second nodes during a time period. When the MR has been received, the first node determines a power for the second node based on a first type and a second type of calculation. The first type is based on the received MR. The second type is based on a second type of information related to the channel during a shorter time period. When the MR has not been received, the first node determines the power based on the second type of calculation. The first node configures the second node to use the determined power.

26 Claims, 6 Drawing Sheets

(56) References Cited

U.S. PATENT DOCUMENTS

2010/0279701 A1 11/2010 Chen
2017/0311251 A1* 10/2017 Liu ..................... H04W 48/20

OTHER PUBLICATIONS

3GPP, "3rd Generation Partnership Project; Technical Specification Group GSM/EDGE Radio Access Network; Link adaptation (Release 12)," 3GPP TS 45.009 V12.0.0, Aug. 2013.
3GPP, "3rd Generation Partnership Project; Technical Specification Group GSM/EDGE Radio Access Network; Base Station Controller—Base Transceiver Station (BSC—BTS) interface; Layer 3 specification (Release 12)," 3GPP TS 48.058 V12.0.0, Sep. 2014.
International Search Report and Written Opinion dated Sep. 10, 2015 in related International Application No. PCT/SE2014/051281.
Ronani et al., "Combined AMR Mode Adaptation and Fast Power Control for GSM Phase 2+," 2005 Asia-Pacific Conference on Communications, Oct. 3-5, 2005, Perth, AU.

* cited by examiner

FIRST NODE AND METHODS THEREIN FOR CONTROLLING A TRANSMISSION POWER OF A SECOND NODE

TECHNICAL FIELD

The present disclosure relates generally to a first node and methods therein for controlling a transmission power of a second node. The present disclosure further relates generally to computer programs and computer-readable storage mediums, having stored thereon the computer programs to carry out these methods.

BACKGROUND

Communication devices such as terminals are also known as e.g. User Equipments (UE), wireless devices, mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3$^{rd}$ Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Spectrum efficiency is an important factor when operators are trying to keep up with the steady traffic growth in Global System for Mobile communications (GSM) systems today. Spectrum refarming, which refers to when some parts of the frequency spectrum that was assigned to GSM are assigned to other radio access technologies, such as, e.g., LTE and High Speed Packet Access (HSPA), puts an even higher demand on spectrum efficiency for the GSM network in order to continue to serve existing traffic. Also, the available transmission power in a radio unit may today be regarded as a common resource to the services the radio unit serves. For example, a radio unit that has a maximum output power of 50 Watts (N) and serves both GSM and LTE, may restrict the output power to a maximum of 20 W for GSM, and 30 W for LTE. Thus, the 20 W for GSM may need to be used efficiently, and the possibility of decreasing the overall output power may be useful. Decreasing the output power may also lower interference, both within GSM, but also between GSM and LTE-carriers that may be using the GMS frequency spectrum.

Measurement Report-Based Power Control

Power control algorithms that may be used for Circuit Switched (CS) services today are most commonly based on radio measurements that are reported by a radio node to the node or nodes serving it. For example, the radio measurements may be reported to a Base Station Controller (BSC) as Received signal QUALity (RXQUAL) and received signal strength or Received signal LEVel (RXLEV), measured on active bursts during a time period, such as a Slow Associated Control Channel (SACCH) period, SUB of FULL measurement set. Because the SACCH period may last 480 ms, the radio signal quality reporting period is relatively long, as it may typically occur every SACCH period of 480 ms interval. One or more of these measurements are reported to the BSC, or an equivalent node, as a so called Measurement Report (MR). An MR may comprise one measurement of signal quality and/or strength of a radio channel between the node sending the MR, and the node receiving the MR. For example, the MR may comprise RXQUAL or RXLEV measurements. In some particular embodiments, the MR may correspond to the measurement report described in 3GPP TS 45.008, version 12.3.0. The MR may be used as input to the power control algorithm in the BSC or equivalent node, which may calculate an appropriate output power for the BTS the BSC controls, DL, and the mobile station served by such BTS, UL.

Figure 1:
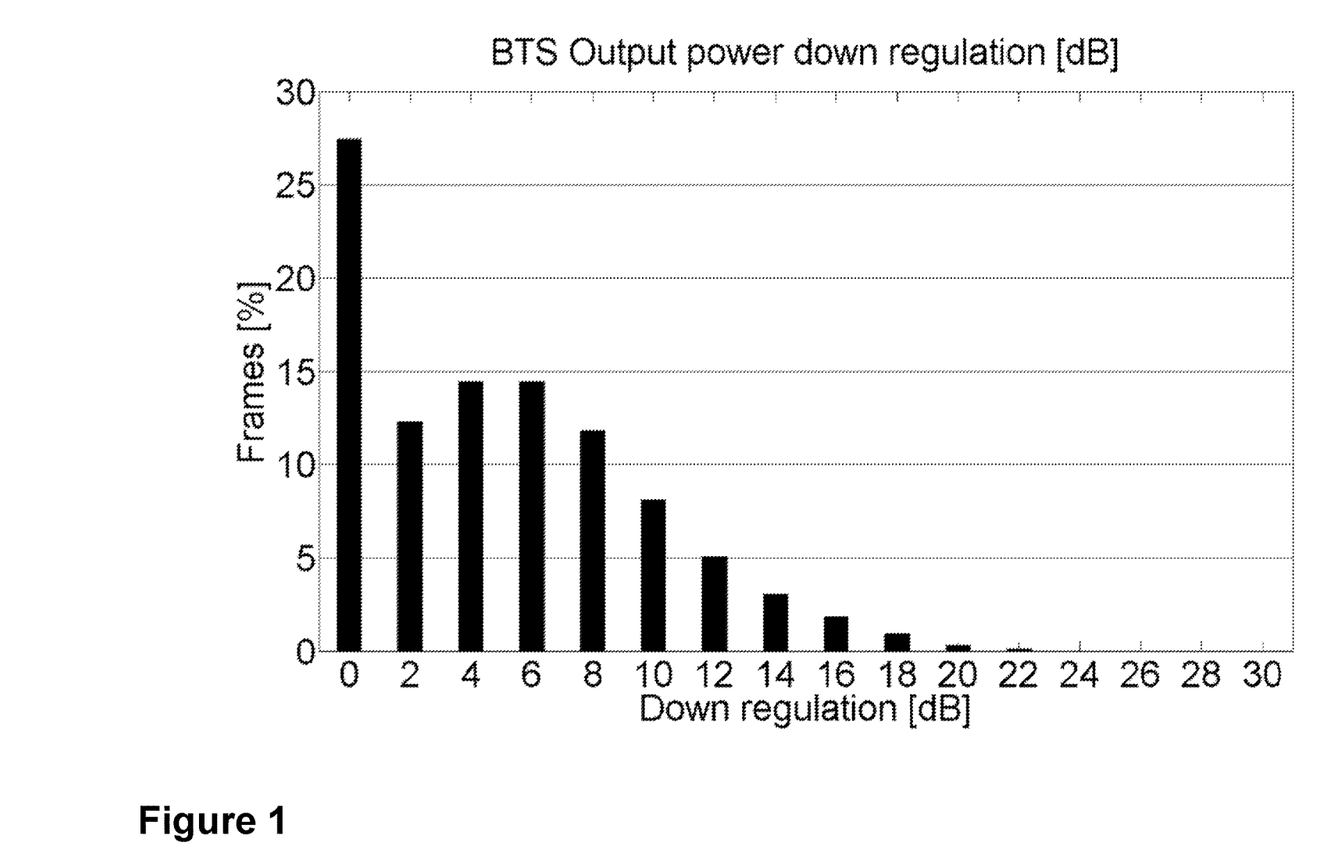
FIG. 1 is a schematic diagram illustrating the output of a power control mechanism, according to an existing solution

FIG. 1 shows an example of the performance of a MR-based power control, in terms of how many speech frames may be sent and with what power. In this case it is a BTS providing the output power down-regulation in deciBels (dB). The bar chart shows the results of the power control in a live network recording from an area of around 600 cells. In total, about 73 000 frames were recorded. The Figure shows the percentage of speech frames sent for each amount of down regulation, with one bar for each power range. The data represented in FIG. 1 corresponds to live recorded data from a large area. As the Figure shows, there are a high fraction of speech frames that are sent with full power in a live network, that is, with 0 down regulation. If the speech frames sent with full output power are excluded, that is, if the bar for the 0 down regulation is excluded, the target down regulation is around 6 dB, i.e. when the connections reach a stable power value. That is, the average power for a speech frame may be approximately 6 dB below the full power. In this example, some connections are down regulated further since they probably have very good radio signal conditions.

A connection subjected to a channel change may most probably start from full power once it is established on the new radio resource. This may also contribute to the high number of speech frames sent with full power.

FIG. 1 shows that, in a live network, although after a stable connection, the average power down regulation of the recorded 73000 frames, excluding the frames with 0 down regulation, is approximately 6 dB, a high fraction of frames are still sent with full power. Thus, MR-based power control algorithm is not very efficient as the fraction of frames that are still sent on full power is high.

Adaptive Multi Rate (AMR) Codec Mode Adaptation

Another one of the existing power control systems is the AMR codec mode adaptation power control algorithm, also referred to herein as the AMR power control algorithm, described e.g., in WO2005/034381 A1. A codec is an apparatus to code audio data, or another type of data. The codec may be used to compress the data, but also to add redundancy such that it may be possible to decode the data after some parts of the coded data have been lost, e.g. when it is transmitted over the air through a radio channel. There may be in this case restrictions on the throughput and latency for the coded data, e.g. how much data may be transmitted per time unit. If no data is expected to be lost in the transmission, a codec with little or even no redundancy may be used. This may allow transmitting the audio with the highest quality. If a lot of data is expected to be lost in the transmission, a robust codec with a lot of redundancy may need to be used. This may represent lower audio quality. It may be possible to reduce the number of lost data by increasing the output power. It may also be possible to correct faulty decoded data, that has been identified as faulty decoded, by retransmitting the corresponding data. This may reduce the throughput of the data and most probably also reduce the audio quality. It may also be allowed to discard faulty decoded or lost data. This may reduce the audio quality.

Thus, based on the quality of the channel, audio quality requirements and power consumption requirements, a codec and a transmission power may be selected.

The AMR codec mode defines a source codec bit rate and the channel rate, i.e. full rate or half rate channel. Codecs are grouped into sets where it may be easy to change codec within the set, e.g. since part of the processing is common, but difficult to change to a codec in another set. An active codec mode set may be defined as the set the currently used codec belongs to. A codec mode position is the position within the active codec set. An active codec set may consist of up to 4 different codec modes, all using the same channel rate. The first position in the active codec set may represent the codec mode with the lowest bit rate, e.g., CODEC_MODE_1 in 3GPP TS 45.009, version 12.0.0. If the active codec set includes more than one codec mode, the second position may refer to the second lowest bit rate, e.g., CODEC_MODE_2 in 3GPP TS 45.009, version 12.0.0. If the active codec set includes more than two codec modes, the third position may refer to the third lowest bit rate, e.g., CODEC_MODE_3 in 3GPP TS 45.009, version 12.0.0, and if the active codec set includes four codec modes, the fourth position may refer to the highest bit rate, e.g., CODEC_MODE_4 in 3GPP TS 45.009, version 12.0.0.

AMR may use an inband signalling procedure that allows for the codec mode to adaptively change every second speech frame within an Active Codec Set, i.e. on a 40 ms basis, according to 3GPP TS 45.009, version 12.0.0. Thus, every 40 ms, a node such as a mobile station may send a codec mode request to another node, such as the BTS, telling which codec rate to use within the active codec set. The request may be based on the estimated Carrier to Interference level (C/I) related to the thresholds sent to the mobile station at call setup, or channel change. An UL Mode Request may give an indication of the quality perceived at the mobile station. An UL Mode Request is a request that may be sent by radio node, e.g., a mobile station, indicating which codec it desires the DL data to be coded with, in order to obtain certain audio quality, e.g., a better audio quality than a current audio quality. A request for a lower codec mode may indicate that the C/I is low and a more robust codec may be used to obtain acceptable speech quality. A request for a higher codec mode may indicate that the C/I has improved. Thus, better speech quality may be obtained with a codec using a higher data rate.

Power Control Based on Mode Request Signaling

Existing solutions have proposed to utilize the AMR codec mode signaling just described in a DL, and potentially also in an UL, as a power control algorithm that potentially may operate with a faster feedback time than 480 ms. This faster feedback may allow for more aggressive regulation procedure towards acceptable speech quality targets. However, a power control algorithm based on the AMR codec mode signaling may be too unstable.

Given the foregoing, the existing methods for power regulation provide inadequate support to the increasing demands for spectrum efficiency.

SUMMARY

It is an object of embodiments herein to improve the performance in a wireless communications network by providing an improved power control method and node.

According to a first aspect of embodiments herein, the object is achieved by a method performed by a first node of controlling a transmission power of a second node. The first node and the second node operate in a wireless communications network. The first node determines whether a Measurement Report (MR) has been received by the first node during a first time period from a third node. The MR comprises a first type of information, related to a quality of a radio channel. The radio channel is established between the third node and the second node during a second time period. The first node determines a transmission power for the second node.

When the MR has been received, the first node determines the transmission power based on a first type of calculation for determining the transmission power and a second type of calculation for determining the transmission power. The first type of calculation is based on the received MR. The second type of calculation is based on a second type of information related to the quality of the radio channel established between the third node and the second node during a third time period. The third time period is a shorter time period than the second time period.

When the MR has not been received, the first node determines the transmission power based on the second type of calculation. The first node configures the second node to use the determined transmission power.

According to a second aspect of embodiments herein, the object is achieved by the first node configured to control the transmission power of the second node. The first node and the second node are configured to operate in the wireless communications network. The first node is further configured to determine whether the MR has been received by the first node during the first time period from the third node. The MR comprises the first type of information. The first type of information is related to the quality of the radio channel. The radio channel is configured to be established between the third node and the second node during the second time period. The first node is further configured to determine the transmission power for the second node.

When the MR has been received, to determine the transmission power is configured to be based on the first type of calculation for determining the transmission power and the second type of calculation for determining the transmission power. The first type of calculation is based on the received MR. The second type of calculation is based on the second type of information related to the quality of the radio channel configured to be established between the third node and the second node during the third time period. The third time period is a shorter time period than the second time period.

When the MR has not been received, to determine the transmission power is configured to be based on the second type of calculation. The first node is further configured to configure the second node to use the determined transmission power.

According to a third aspect of embodiments herein, the object is achieved by a computer program, comprising instructions which, when executed on at least one processor, cause the at least one processor to carry out the method performed by the first node.

According to a fourth aspect of embodiments herein, the object is achieved by a computer-readable storage medium, having stored thereon the computer program, comprising instructions which, when executed on at least one processor, cause the at least one processor to carry out the method performed by the first node.

By determining the transmission power of the second node based on the first type of calculation and/or the second type of calculation, depending on whether the MR has been received or not, the first node may provide an optimized power control mechanism. This is because the first node may utilize the information on the quality of the radio channel established between the third node and the second node, as it becomes available in the first time period and the third time period, to provide a power control mechanism that may be both reliable and quick responding. A detailed feedback may be provided in the form of a MR from the third node, which may be slower due to the fact that involves measurement information in the first type of information. Faster and coarser feedback may be provided by the second type of information, e.g., an UL Mode Request, which comprises an indication of the quality of the radio channel in a time period that is shorter than the second time period, during which the information for the MR is collected.

Therefore, the first node provides a faster power regulation to get system capacity gains, reduce power, interference and poor quality communications.

Further advantages of some embodiments disclosed herein are discussed below.

BRIEF DESCRIPTION OF THE DRAWINGS

Examples of embodiments herein are described in more detail with reference to the accompanying drawings, in which.

DETAILED DESCRIPTION

As part of developing embodiments herein, one or more problems that may be associated with use of at least some of the prior art solutions, and that may addressed by embodiments herein, will first be identified and discussed.

With regards to the power control algorithms used for CS services, one problem is that the radio signal quality reporting period is relatively long for a CS call carried on a GSM system, every SACCH period of 480 ms interval. Due to this, it may be necessary to be careful when down regulating the power for a CS call, since the feedback is needed to determine the effect from the regulation. If the process of power regulation is done too fast or with too large power steps in each regulation interval, there may be a risk of unstable behaviour, resulting in degradation of user perceived speech quality or, in the worst case, of losing the connection all together.

The AMR codec mode signalling, on the other hand, may be much faster. However, AMR has coarse granularity and may not give sufficient information, on which reliable power control decisions may be based.

Embodiments herein address the foregoing problems by utilizing both the slow measurements of MR-based power control and the fast AMR codec mode signaling, and combine them into a both reliable and quickly responding power control mechanism.

In particular, embodiments herein provide a power control mechanism based on AMR codec mode adaptation.

The algorithm described herein is exemplified for the DL direction but the same type of algorithm may be implemented for the UL as well. The UL implementation will be briefly discussed later.

In general terms, embodiments herein involve the usage of the AMR power control algorithm as add-on functionality to the MR-based power control so that an improved power control mechanism is achieved.

Embodiments will now be described more fully hereinafter with reference to the accompanying drawings, in which examples of the claimed subject matter are shown.

The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Figure 2:
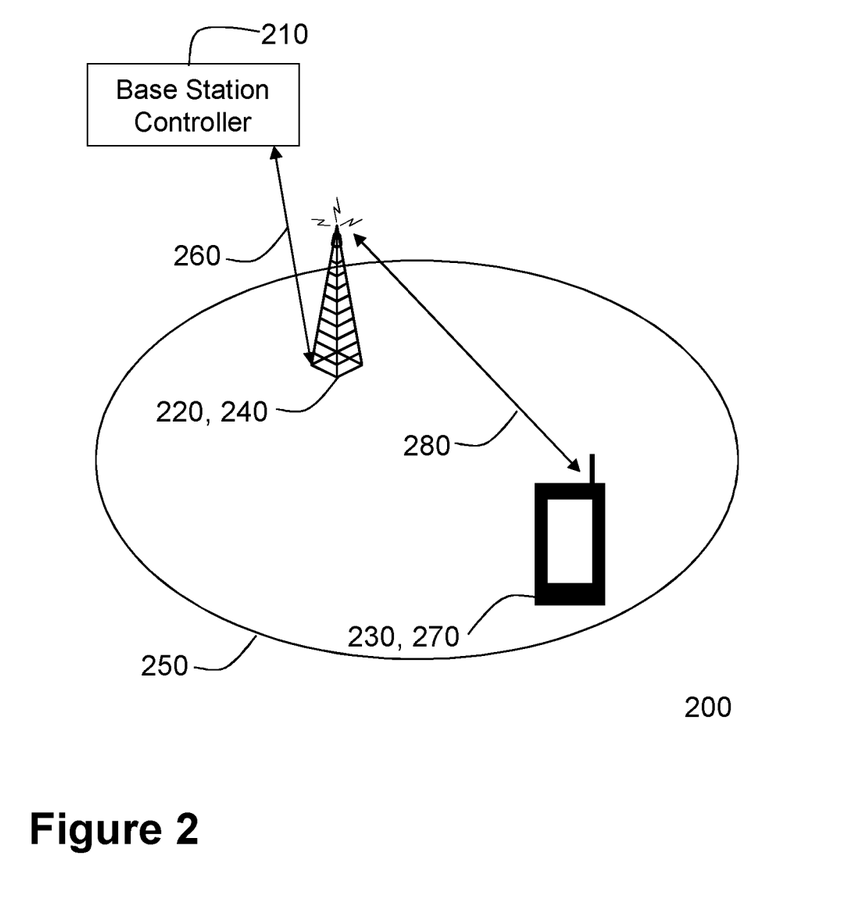
FIG. 2 is a schematic diagram illustrating embodiments in a wireless communications network.

FIG. 2 depicts a wireless communications network 200 in which embodiments herein may be implemented. The wireless communications network 200 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, GSM network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi network, Worldwide Interoperability for Microwave Access (WiMax), 5G system or any cellular network or system.

The wireless communications network 200 comprises a first node 210, a second node 220 and a third node 230. The first node 210, the second node 220, and the third node 230, may correspond to different nodes in the wireless communications network 200 depending on whether the embodiments concern DL communications or UL communications. In the non-limiting example of FIG. 2, the embodiment represented concerns the DL communication scenario. The first node 210, the second node 220, and the third node 230 will be described first in the context of DL communications.

In the embodiments wherein the wireless communications network 200 is a GSM network, the first node 210 may be a BSC 210, that is, a node controlling the functions of a BTS. This particular embodiment is illustrated in the non-limiting example of FIG. 2. The first node 210 may be a node with an equivalent function, when the wireless communications network 200 is based on another technology.

The second node 220 may be a radio network node 240, such as a BTS 240, a base station such as e.g. an eNB, eNodeB, femto Base Station, BS, or any other network unit capable to serve a wireless device or a machine type communication device in the wireless communications network 200. The radio network node 240 may be e.g. macro eNodeB, or a Home Node B, home eNodeB or pico base station, based on transmission power and thereby also cell size. In some particular embodiments, the second node 220 may be a stationary relay node or a mobile relay node. The wireless communications network 200 covers a geographical area which is divided into cell areas, wherein each cell area is served by a radio network node, although, one radio network node may serve one or several cells. In the example depicted in FIG. 2, the radio network node 240 serves a cell 250. Typically, the wireless communications network 200 may comprise more cells similar to the cell 250, served by their respective network nodes. This is not depicted in FIG. 2 for the sake of simplicity. The radio network node 240 may support one or several communication technologies, and its name may depend on the technology and terminology used. In some of the embodiments wherein the wireless communications network 200 is a GSM network, the second node 220 may be the BTS 240. This particular embodiment is illustrated in the non-limiting example of FIG. 2. The first node 210 and the second node 220 may be in communication through a link 260.

In some embodiments wherein the wireless communications network 200 is based on other technologies than GSM, the first node 210 and the second node 220 may be the same node.

The third node 230 may be a wireless device 270. A number of wireless devices are located in the wireless communications network 200. In the example scenario of FIG. 2, only one wireless device 270 is shown.

The wireless device 270 is a wireless communication device such as a UE which is also known as e.g. mobile terminal, wireless terminal and/or mobile station. The wireless device 270 is wireless, i.e., it is enabled to communicate wirelessly in the wireless communication network 200, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless communications network 200.

The wireless device 270 may further be referred to as a mobile telephone, cellular telephone, or laptop with wireless capability, just to mention some further examples. The wireless device 270 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device, modems, or any other radio network unit capable of communicating over a radio link in a cellular communications system. Particular embodiments of the wireless device 270 that may be served by such a system include Machine Type Communication (MTC) devices such as sensors. In some of the embodiments wherein the wireless communications network 200 is a GSM network, the third node 270 may be a mobile station 270. This particular embodiment is illustrated in the non-limiting example of FIG. 2. The second node 220 and the third node 230 may be in communication through a radio link 280, which in some embodiments may be a GSM radio link. In these embodiments, the radio link 280 may also be referred to herein as a radio channel 280.

In the embodiments concerning UL communications, the first network node 210 may be the BSC 210, or the equivalent node, as described above, the second node 220 may be the wireless device 270, and the third node 230 may be the network node 240, as described above.

Figure 3:
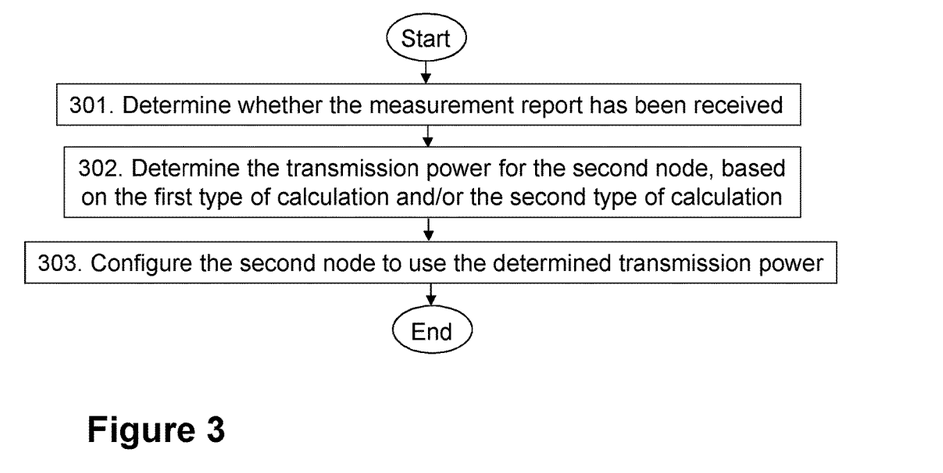
FIG. 3 is a schematic diagram illustrating embodiments of a method in a first node.

Embodiments of a method performed by the first node 210 of controlling a transmission power of the second node 220, will now be described with reference to the flowchart depicted in FIG. 3. The transmission power may be of the second node 220 towards the third node 230. As stated earlier, the first node 210 and the second node 220 operate in the wireless communications network 200.

In some embodiments, for example, wherein the communication takes place in the DL direction, the first node 210 is the BSC 210, the second node 220 is the BTS 240 and the third node 230 is the wireless device 270, which wireless device 270 is served by the second node 220. The following discussion will be described in the context of the DL communication. The UL communication scenario will be discussed later.

The method may comprise the following actions, which actions may as well be carried out in another suitable order than that described below.

Action 301

In order to improve the spectrum efficiency of the wireless communications network 200, the first node 210 may control the transmission power of the second node 220 towards the third node 230. This may be performed based on information comprised in a MR received from the third node 230. The MR may have been received in a time period referred to herein as a first time period. The information comprised in the received MR is related to a quality of the radio channel 280 established between the third node 230 and the second node 220, as collected or measured during a second time period. This information may be referred to herein as a first type of information. In particular embodiments, the second time period is a SACCH, period. This first type of information may then have been obtained by the first node 210 from the third node 230 through the MR, in the first time period, which is a period following the completion of the second time period. The different time periods described herein are illustrated in a particular example in FIG. 4, which will be described later.

Thus, in this action 301, the first node 210 determines whether a MR has been received by the first node 210 during the first time period from the third node 230. The MR comprises the first type of information, related to the quality of the radio channel 280. The radio channel 280 is established between the third node 230 and the second node 220 during the second time period.

As described above, the first type of information may comprise measurement information. The measurement information may comprise one or more measurements of signal quality and/or strength, as described earlier, of the radio channel 280 during the second time period. For example, the measurement information may comprise RXQUAL or RXLEV measurements. The measurement information may be collected, for example, by the third node 230.

Action 302

In this action 302, the first node 210 determines the transmission power for the second node 220. This action is performed so that the first node 210 may later regulate the transmission power of the second node 220, so that the quality of the radio channel 280 established between the third node 230 and the second node 220 may be of an acceptable level, while ensuring that power resources are not overused. This way, spectrum efficiency of the wireless communications network 200 may be optimized.

In this action, the first node 210 may determine 302 the transmission power for the second node 220 by using feedback information on the quality of the radio channel 280 established between the third node 230 and the second node 220. The first node 210 may rely its determination on feedback information received in shorter time intervals than the second time period. This feedback information may be of coarser granularity, e.g., through the AMR algorithm, than that comprised in the MR. The first node 210 may additionally rely on feedback information received in longer time intervals, but with higher granularity, e.g., through the MR.

Accordingly, the first node 210 may determine 302 or calculate the transmission power of the second node 220, with one type of calculation or another, depending on the type of information that is available, that is, depending on whether the MR has been received from the third node 230 or not. If the MR has been received, the determination of the transmission power may be performed through a first type of calculation. The first type of calculation is based on the first type of information comprised in the received MR. In some embodiments, the first type of calculation may be the MR-based power control described earlier. If the MR has not been received, the determination of the transmission power may be based on a second type of information, through a second type of calculation, as described below.

Thus, when the MR has been received, the determining 302 of the transmission power is based on the first type of calculation for determining the transmission power and the second type of calculation for determining the transmission power. The first type of calculation is based on the received MR. The second type of calculation is based on the second type of information related to the quality of the radio channel 280 established between the third node 230 and the second node 220 during a third time period. The third time period is a shorter time period than the second time period, as described further down below. The third time period may be different than the second time period, but it may be comprised in the second time period. The second type of information may then provide a faster type of feedback on the quality of the radio channel 280 established between the third node 230 and the second node 220 to the first node 210 than that provided by the first type of information.

The second type of information may be obtained by the first node 210, and may comprise an indication of the quality of the radio channel 280 as perceived by the third node 230. The indication comprised in the second type of information may differ from the first type of information comprised in the MR in that it may indicate that the radio link quality has improved or deteriorated, without comprising measurements such as RXQUAL or RXLEV measurements. In some embodiments, the second type of calculation is the AMR power control algorithm. In these embodiments, the second type of information may comprise an UL Mode Request. The second type of information may comprise information of a currently used codec mode, which together with the UL Mode Request may indicate that the radio link quality of the radio channel 280 has improved or deteriorated.

The third time period may be, for example, two speech frames. A speech frame may be as described, for example, in 3GPP TS 45.009, version 12.0.0. The two speech frames may take place during the occurrence of the second time period, e.g., during the SACCH period. These embodiments are used as a non-limiting illustrative example in the following discussion, wherein the first type of calculation may be referred to as the existing MR-based power control or the outer loop, and the second type of calculation may be referred to as the add-on functionality or the inner loop.

In embodiments herein, the existing first type of calculation may be used as a base, and, for example, during the second time period, the power may be regulated according to the information from the UL Mode Request. The first type of calculation may be seen as a slow working power control in an outer loop and the second type of calculation may be seen as a fast working power control in an inner loop. The second type of calculation may regulate the power as fast as every second speech frame. The first type of calculation may regulate e.g., once every SACCH-period.

The first type of calculation may operate on the assumption that the power has been constant during a last second time period, e.g., a last SACCH period, but this may no longer be the case when the second type of calculation power control operates during the second time period. Therefore, a weighted sum over the used output powers during the second time period may be implemented. The reason for this weighted sum may be that the conclusion from the first type of calculation on what power to use is more valid if a weighted sum over the used powers during the second time period is used as input to the first type of calculation instead of the suggested power for the next speech frame from the second type of calculation. The weights in the weighted sum may be determined e.g. by providing more significance to the second type of calculations in the beginning of first time period, or by providing equal weights, so that the weighted sum of all the second type calculations give the arithmetic mean.

Thus, the first type of calculation for determining 302 the transmission power may have a first input, A, and a first output, B. In some embodiments, the second type of calculation for determining the transmission power may be based on the second type of information on the quality of the radio channel 280 established between the third node 230 and the second node 220 during one or more third time periods during the second time period. Each second type of calculation for each of the one or more third time periods may have a second output, C. The first input, A, to the first type of calculation may then be the first type of information, e.g., in the MR received, and one or a combination of:

a. one previous output of the first type of calculation or a weighted sum of several previous first type of calculations; Each of the previous first type of calculations is a calculation equivalent to the first type of calculation, performed based on an MR received in a time period equivalent to, but earlier than, the first time period. For example, based on an MR received, based on an earlier time period equivalent to the second time period, e.g., an earlier SACCH period;

b. one output of the second type of calculation for one of the one or more third time periods, e.g., the output of the AMR power control algorithm during the first two speech frames of the SACCH period; and c a weighted sum of all second outputs of the second type of calculation performed during the second time period.

Accordingly, in some embodiments, the first type of calculation has a first output, B, and the second type of calculation has a second output, C. The determining 302 of the transmission power based on the first type of calculation and the second type of calculation may comprise calculating the transmission power for the second node 220 as a weighted sum of the first output B and the second output C.

The first node 210 may determine 302 the transmission power for the second node 220 in this action, through different implementations, wherein the first type of calculation has a first input, A, and a first output, B, and the second type of calculation has a second output, C:

In a first implementation, a target codec based AMR power control may be used as an add-on algorithm to the MR-based power control. The add-on power control may regulate towards a given codec. Hence, in some embodiments, the second type of calculation may comprise regulating the second output, C, such that a codec mode position requested by the third node 230 in the second type of information approaches a given codec mode position.

In a second implementation, the second type of calculation may decrease the power by a power step when the UL Mode Request>codec mode used, where the UL Mode Request may be the UL Mode Request from the third node 230, and the codec mode used may be the codec mode that the third node 230 just used. Note the strictly larger than. Accordingly, in some embodiments, the second type of calculation may comprise decreasing the second output, C, by a power step when a codec mode position requested by the third node 230 in the second type of information is larger than a currently used codec mode position by the third node 230.

In a third implementation, the second type of calculation may decrease the power by a power step when the UL Mode Request codec mode used and the UL Mode Request≠1, where the UL Mode Request may be the UL Mode Request from the third node 230, codec mode used may be the codec mode that the third node 230 just used, and 1 may refer to the codec mode position within the active codec set, which may be the lowest rate, i.e. the most robust codec in the set. Thus, in some embodiments, the second type of calculation may comprise decreasing the second output, C, by a power step when a codec mode position requested by the third node 230 is larger than or equal to the currently used codec mode position by the third node 230, wherein the requested codec mode position is different than 1.

In a fourth implementation, the third implementation may be combined with increasing the power by a power step when the latest inner loop power regulation may have resulted in a lower codec mode than before. In this case, the first node 210 may need to store the old codec modes used.

Accordingly, in some embodiments, the second type of calculation may comprise increasing the second output, C, by a power step when a codec mode position requested by the third node 230 is lower than a currently used codec mode position by the third node 230.

In a fifth implementation, the first node 210 may decrease the power by a power step when the UL Mode Request=highest codec mode position, where the highest codec mode position refers to the codec mode position in the active codec mode set holding the codec with the highest bit rate, i.e. the least robust codec within the set. Hence, in some embodiments, the second type of calculation may comprise decreasing the second output, C, by a power step when the codec mode position requested by the third node 230 is equal to a highest codec mode position in an active codec mode set in the third node 230, wherein the requested codec mode position is different than 1.

With the second type of calculation, the output power from the second node 220 may be decreased so much, that the C/I the quality of the radio channel 280—gets so low that the third node 230 may indicate that it wants a more robust codec mode, that is, a lower codec mode. A lower codec mode represents a loss of quality of the speech. To avoid a change to a lower codec mode, in some embodiments, the second type of calculation comprises usage of a dummy codec. One or several "dummy codec" modes may be used. The purpose of the "dummy codec" may be to allow the third node 230 to indicate indirectly that a lower transmission power may be used with the current "codec mode used", by sending an UL Mode Request with a "dummy codec" mode that is one higher than the highest codec mode in the active codec set, even if the "codec mode used" is already the highest codec mode. This may be to avoid that the transmission power is not down-regulated so far down that a lower codec mode is required. This way, one of the C/I thresholds comprised in the active codec set may be used for AMR power regulation purposes instead of changing codec. If the active codec set only contains 3 codec modes, the last space may include a "dummy codec" so all C/I thresholds in the active codec set are used.

The power step for the second type of calculation may be either constant or adaptive.

The determining 302 the transmission power may be further based on a minimum power limit and a maximum power limit. These power limits may be for example configured by the operator of the wireless communications network 200. In some embodiments, certain power limits or Frame Erasure Rate (FER) limits for certain codec modes may be used. The FER limits may indicate the rate of lost frames.

In some embodiments, the second type of calculation is further based on a last received MR. The latest received MR may then also be used within the AMR power algorithm. The last received MR may comprise the first type of information comprising measurement information on the quality of a radio channel 280 established between the third node 230 and the second node 220 during a fourth time period. The fourth time period may end no later than when the third time period ends. The latest received MR may for example be weighted, so the longer into the inner loop, the less consideration one may give to the RXLEV and RXQUAL from the latest MR.

In some embodiments a previously received MR, that is not the last one received MR may be used within the AMR power algorithm. The previously received MR may comprise the first type of information comprising measurement information on the quality of a radio channel 280 established between the third node 230 and the second node 220 during a time period equivalent, but previous to the fourth time period.

In some embodiments, the MR or the latest received MR may be an Enhanced MR (EMR). The EMR may provide the algorithm with a higher potential, since finer granularity of the quality input to the first type of calculation may be available with the EMR.

When the MR has not been received, the determining 302 the transmission power is based on the second type of calculation.

Action 303

To control the transmission power of the second node 220, so that spectrum efficiency is optimized, in this action, the first node 210 configures the second node 220 to use the determined transmission power, according to action 302.

This may be implemented, for example, by sending a BS power control message, as described in 3GPP TS 48.058 version 12.0.0 to the second node 220.

For the context of UL communications, in the actions 301-303 just described, the first node 210 may be the BSC 210, the second node 220 may be a wireless device 270, and the third node 230 may be a BTS 240 serving the second node 220. The second type of calculation may be an AMR power control algorithm, wherein the second type of information comprises a DL Mode Request. The third time period may also be two speech frames.

Actions 301-303 may be repeated by the first node 210 for every cycle of the first time period and the second time period, that is, every SACCH period.

Figure 4:
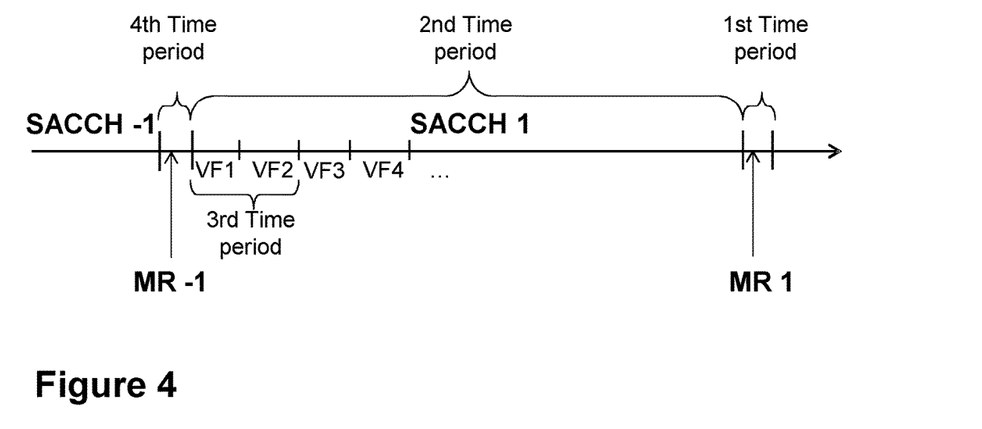
FIG. 4 is a schematic diagram illustrating embodiments of time periods in a method in a first node.

FIG. 4 illustrates a particular example of the different time periods referred to herein, wherein the second time period is a SACCH period, and wherein the third time period is two speech frames or Voice Frames (VF). In FIG. 4, the MR is represented as MR1, and is received in the first time period. The last received MR is represented in the Figure as MR-1, and is received in the fourth time period. The SACCH period on which the last received MR is based, is represented as SACCH-1 in the Figure. To simplify the Figure, only a few of the 24 speech frames that may be comprised in the SACCH period are represented. FIG. 4 is a schematic representation for illustrative purposes only, and it is not drawn to scale. Thus, the relative proportions between the different time periods have not been kept.

The embodiments of the method just described in actions 301-303 may provide several advantages. First, embodiments herein may provide improved spectrum efficiency. This may be due to more efficient power regulation that may lead to less radiated interference.

Second, embodiments herein may provide improved energy efficiency, since no unnecessary power is used to obtain the service quality requested.

Third, embodiments herein may provide reduced mean and peak power requirements in a base station equipped with a Multi-Carrier Power Amplifier (MCPA). A MCPA may amplify signals for multiple carriers simultaneously. The MCPA may need to amplify a combined signal, accordingly. Since embodiments herein may allow both for faster down regulation of the power, as well as lower power in a more steady state, the power of the signals for which embodiments herein may be applied to, is reduced. This means that the mean power of the combined signal may also be reduced. It also means that the time spent using high transmission power for the directly affected signals may be reduced. Hence, the probability for a peak power, of the combined signal, above a certain limit may be reduced as well.

Figure 5:
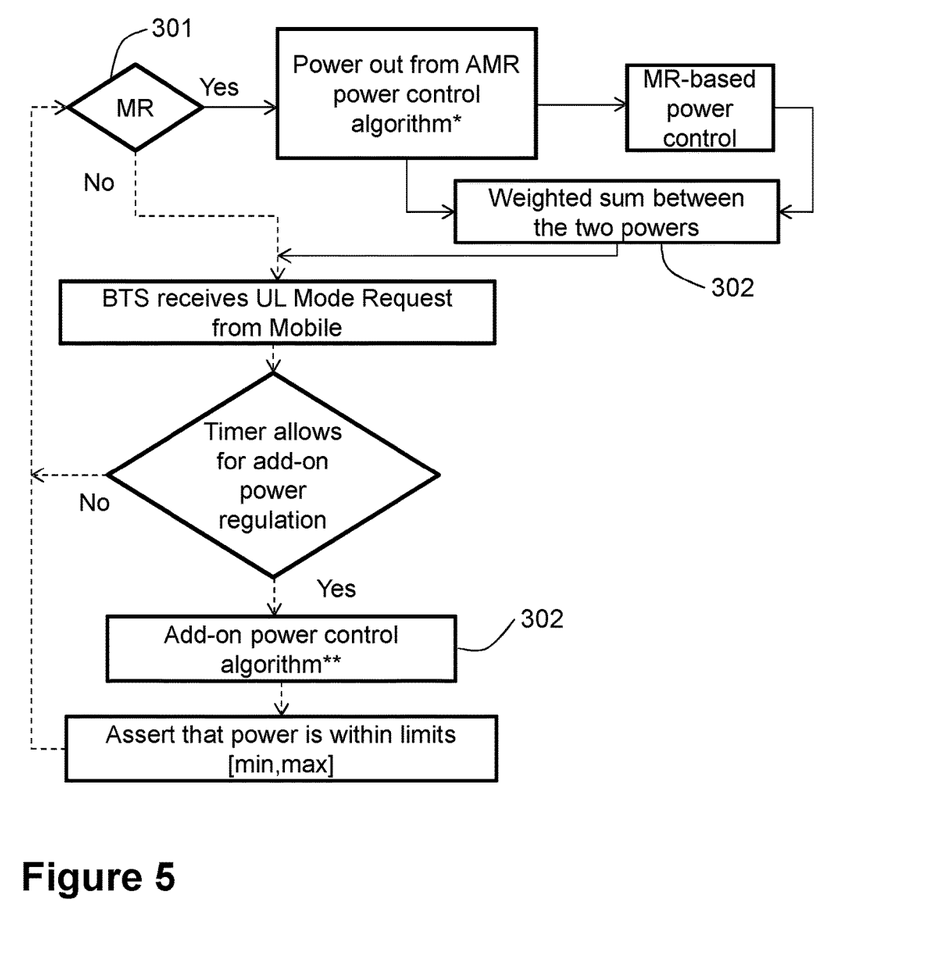
FIG. 5 is a flowchart illustrating embodiments of a method in a first node.

FIG. 5 illustrates a flowchart of particular embodiments of actions 301 and 302 of the method disclosed herein, in a more detailed fashion. In the example of FIG. 5, the second node 220 is a BTS and the third node 230 is a mobile station, represented as "mobile". When the first node 210 determines that the MR has been received in action 301, the first type of calculation, represented in the Figure as the MR-based power control, may be used in determining the transmission power for the second node 220 in action 302. The power used as input to the MR-based power control may be the power regulated in the second type of calculation or add-on functionality in the inner loop or a combination of previous first type calculations and second type calculations, which is represented in the Figure with the example of the AMR power control algorithm as Power out. The dashed lines in FIG. 5 indicate the inner loop or second type of calculation. This power out may be implemented so that it either is the next power that the inner loop may have used, or it may be a weighted sum of all the different powers used since the last MR, that is, it may be a mean of all the different powers used in the second time period, or it may be a weighted sum between previous first type calculations and second type calculations during the second time period. In the particular embodiment shown in FIG. 5, the first node 210 determines the transmission power for the second node 220, when the MR has been received, as a weighted sum between the power output of the first type of calculation, and the power output of the second type of calculation.

When the first node 210 determines that the MR has not been received in action 301, the second type of calculation is used in determining the transmission power for the second node 220 in action 302. The method as described herein, assumes that the second type of information is obtained, e.g., through an UL Mode Request from the third node 230, as shown in the Figure. However, the add-on functionality may only be allowed to regulate the power when the second type of information is obtained, e.g., when the UL Mode Request has been received from the mobile station 270. In some embodiments, as that represented in FIG. 5, a timer may control when the add-on functionality may be allowed to regulate the power of the second node 220. The lowest parameter setting for the timer may be to regulate the power of the second node 220 every time the second type of information is obtained, such as every time an UL Mode Request may be received. Thus, the timer may be set with a lowest parameter of every second speech frame.

In these particular embodiments, when the timer is running, as triggered by the receipt of the second type of information, the second type of calculation is triggered, as described in action 302. In the particular embodiment represented in FIG. 5, the first node 210 may assert that the determined power in action 302 is within certain minimum and/or maximum limits, as they may have been configured, for example, by the operator of the wireless communications network 200. If the timer does not allow for the second type of calculation, the first node 210 may wait for a next determination of whether a new MR, MR+1, has been received in a new first time period.

In FIG. 5, * indicates that the box has three alternatives, as described above, while ** indicates that the box has several alternatives, as also described earlier with the five different implementations.

To perform the method actions described above in relation to FIGS. 3-5, the first node 210 is configured to control the transmission power of the second node 220. The first node 210 comprises the following arrangement depicted in FIG.

Figure 6:
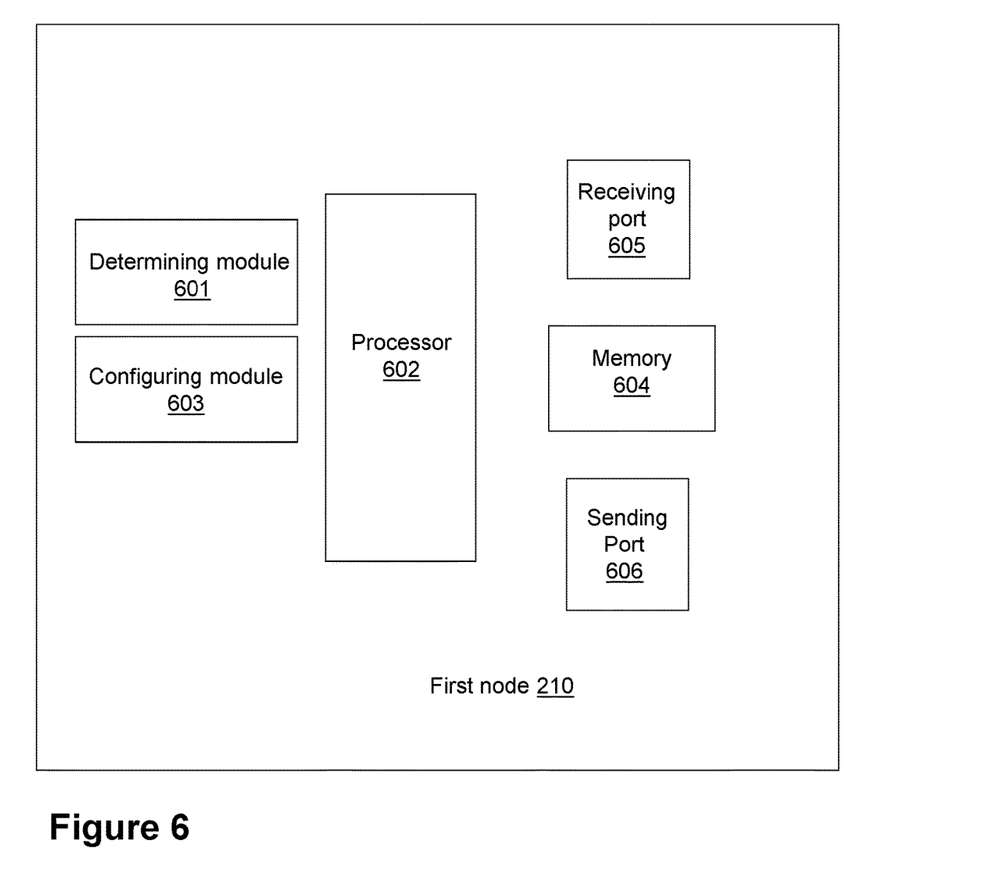
FIG. 6 is a block diagram of a first node that is configured.

6. As already mentioned, the first node 210 and the second node 220 are configured to operate in a wireless communications network 200.

The detailed description of some of the following corresponds to the same references provided above, in relation to the actions described for the first node 210, and will thus not be repeated here.

The first node 210 being further configured to, e.g., by means of a determining module 601, determine whether the MR has been received by the first node 210 during the first time period from the third node 230. The MR comprises the first type of information, related to the quality of a radio channel 280. The radio channel 280 is configured to be established between the third node 230 and the second node 220 during the second time period. The first type of information may comprise measurement information.

The determining module 601 may be a processor 602 of the first node 210.

In some embodiments, the first node 210 may be further configured to determine the transmission power for the second node 220. When the MR has been received, "to determine the transmission power" is configured to be based on: a) the first type of calculation for determining the transmission power, and b) the second type of calculation for determining the transmission power. The first type of calculation is based on the received MR. The second type of calculation is based on the second type of information related to the quality of the radio channel 280 configured to be established between the third node 230 and the second node 220 during the third time period. The third time period is a shorter time period than the second time period When the MR has not been received, "to determine the transmission power" is configured to be based on the second type of calculation. This may also be implemented by the determining module 601.

The second type of information may be configured to be obtained by the first node 210, and may comprise the indication of the quality of the radio channel 280 as perceived by the third node 230.

The second time period may be the SACCH period.

The first node 210 may be the BSC 210, the second node may be the BTS 240 and the third node may be the wireless device 270 configured to be served by the second node 220.

In some embodiments, the second type of calculation is the AMR power control algorithm, and the second type of information is configured to comprise an UL Mode Request, and the third time period is two speech frames.

In some embodiments, the first node 210 is the BSC 210, the second node 220 is the wireless device 270, the third node 230 is the BTS 240 serving the second node 220, the second type of calculation is the AMR power control algorithm, the second type of information is configured to comprise a DL Mode Request, and the third time period is two speech frames.

In some embodiments, the first type of calculation for determining the transmission power has a first input, A, and a first output, B. The second type of calculation for determining the transmission power is based on the second type of information on the quality of the radio channel 280 configured to be established between the third node 230 and the second node 220 during one or more third time periods during the second time period. Each second type of calculation for each of the one or more third time periods has a second output, C. The first input, A, to the first type of calculation is the first type of information and one or a combination of:

a. one previous output of the first type of calculation or a weighted sum of several previous first type of calculations;
 b. one output of the second type of calculation for one of the one or more third time periods; and
 c. the weighted sum of all second outputs of the second type of calculation performed during the second time period.

In some embodiments, the first type of calculation has a first output, B, the second type of calculation has a second output, C, and to determine the transmission power based on the first type of calculation and the second type of calculation comprises calculating the transmission power for the second node 220 as the weighted sum of the first output B and the second output C.

The second type of calculation may be further configured to be based on the last received MR. The last received MR comprises the first type of information comprising measurement information on the quality of the radio channel 280 configured to be established between the third node 230 and the second node 220 during the fourth time period. The fourth time period is configured to end no later than when the third time period is configured to end.

In some embodiments, the first type of calculation has a first input, A, and a first output, B, wherein the second type of calculation has a second output, C, and wherein the second type of calculation is configured to comprise at least one of:

d. regulating the second output, C, such that a codec mode position configured to be requested by the third node 230 in the second type of information approaches the given codec mode position;
 e. decreasing the second output, C, by a power step when a codec mode position configured to be requested by the third node 230 in the second type of information is larger than the codec mode position configured to be currently used by the third node 230;
 f. decreasing the second output, C, by a power step when the codec mode position configured to be requested by the third node 230 is larger than or equal to the codec mode position configured to be currently used by the third node 230, wherein the codec mode position configured to be requested is different than 1;
 g. increasing the second output, C, by a power step when the codec mode position configured to be requested by the third node 230 is lower than the codec mode position configured to be currently used by the third node 230;
 h. decreasing the second output, C, by a power step when the codec mode position configured to be requested by the third node 230 is equal to the highest codec mode position in the active codec mode set in the third node 230, wherein the codec mode position configured to be requested is different than 1.

To determine the transmission power may be further configured to be based on the minimum power limit and the maximum power limit.

The second type of calculation may be configured to comprise usage of the dummy codec.

The first node 210 is further configured to, e.g., by means of a configuring module 603, configure the second node 220 to use the determined transmission power.

The configuring module 603 may be the processor 602 of the first node 210.

The embodiments herein for controlling the transmission power of the second node 220 may be implemented through one or more processors, such as the processor 602 in the first node 210 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the first node 210. One such carrier may be in the form of a CD ROM disc. It is however feasible with other data carriers such as a memory stick. The computer program code may furthermore be provided as pure program code on a server and downloaded to the first node 210. As indicated above, the processor 602 may comprise one or more circuits, which may also be referred to as one or more modules in some embodiments, each configured to perform the actions carried out by the first node 210, as described above in reference to FIG. 6, e.g., the determining module 601 and the configuring module 603. Hence, in some embodiments, the determining module 601 and the configuring module 603 described above may be implemented as one or more applications running on one or more processors such as the processor 602. That is, the methods according to the embodiments described herein for the first node 210 are respectively implemented by means of a computer program product, comprising instructions, i.e., software code portions, which, when executed on at least one processor, cause the at least one processor to carry out the actions described herein, as performed by the first node 210. The computer program product may be stored on a computer-readable storage medium. The computer-readable storage medium, having stored thereon the computer program, may comprise instructions which, when executed on at least one processor, cause the at least one processor to carry out the actions described herein, as performed by the first node 210. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The first node 210 may further comprise a memory 604 comprising one or more memory units. The memory 604 may be arranged to be used to store obtained information, such as the information received by the processor 602, store data configurations, schedulings, and applications etc. to perform the methods herein when being executed in the first node 210. Memory 604 may be in communication with the processor 602. Any of the other information processed by the processor 602 may also be stored in the memory 604.

In some embodiments, the MR or information e.g., from any of the second node 220 and the third node 230, may be received through a receiving port 605. The receiving port 605 may be in communication with the processor 602. The receiving port 605 may also be configured to receive other information.

The processor 602 may be further configured to send messages such as a configuration message, e.g., to any of the second node 220 and the third node 230, through a sending port 606, which may be in communication with the processor 602, and the memory 604.

Those skilled in the art will also appreciate that the any module within the first node 210, e.g., determining module 601 and the configuring module 603 described above, may refer to a combination of analog and digital circuits, and/or one or more processors configured with software and/or firmware, e.g. stored in the memory, that when executed by the one or more processors such as the processor 602, perform actions as described above, in relation to FIGS. 3-5. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a first node of controlling a transmission power of a second node, wherein the first node and the second node operate in a wireless communications network, the method comprising:
   determining whether a measurement report has been received by the first node during a first time period from a third node, wherein the measurement report comprises a first type of information, related to a quality of a radio channel, which radio channel is established between the third node and the second node during a second time period,
   determining a transmission power for the second node, wherein:
      when the measurement report has been received, the determining the transmission power is based on a first type of calculation for determining the transmission power and a second type of calculation for determining the transmission power, wherein the first type of calculation is based on the received measurement report, and wherein the second type of calculation is based on a second type of information related to the quality of the radio channel established between the third node and the second node during a third time period, wherein the third time period is a shorter time period than the second time period,
      when the measurement report has not been received, the determining the transmission power is based on the second type of calculation, and
      configuring the second node to use the determined transmission power.

2. The method of claim 1, wherein the first type of information comprises measurement information, and wherein the second type of information is obtained by the first node, and comprises an indication of the quality of the radio channel as perceived by the third node.

3. The method of claim 1, wherein the second time period is a Slow Associated Control Channel, SACCH, period.

4. The method of claim 1, wherein the first node is a Base Station Controller, the second node is a Base Transceiver Station and the third node is a wireless device served by the second node.

5. The method of claim 1, wherein the second type of calculation is an Adaptive Multi Rate, AMR, power control algorithm, wherein the second type of information comprises an Uplink Mode Request, and wherein the third time period is two speech frames.

6. The method of claim 1, wherein the first node is a Base Station Controller, the second node is a wireless device, and the third node is a Base Transceiver Station serving the second node, and wherein the second type of calculation is an Adaptive Multi Rate, AMR, power control algorithm, the second type of information comprises a Downlink Mode Request, and wherein the third time period is two speech frames.

7. The method of claim 1, wherein the first type of calculation for determining the transmission power has a first input, A, and a first output, B, wherein the second type of calculation for determining the transmission power is based on the second type of information on the quality of the radio channel established between the third node and the second node during one or more third time periods during the second time period, wherein each second type of calculation for each of the one or more third time periods has a second output, C, and wherein the first input, A, to the first type of calculation is the first type of information and one or a combination of:
   a. one previous output of the first type of calculation or a weighted sum of several previous first type of calculations;
   b. one output of the second type of calculation for one of the one or more third time periods; and
   c. a weighted sum of all second outputs of the second type of calculation performed during the second time period.

8. The method of claim 1, wherein the first type of calculation has a first output, B, wherein the second type of calculation has a second output, C, and wherein the determining the transmission power based on the first type of calculation and the second type of calculation comprises calculating the transmission power for the second node as a weighted sum of the first output B and the second output C.

9. The method of claim 1, wherein the second type of calculation is further based on a last received measurement report, wherein the last received measurement report comprises the first type of information comprising measurement information on the quality of a radio channel established between the third node and the second node during a fourth time period, wherein the fourth time period ends no later than when the third time period ends.

10. The method of claim 1, wherein the first type of calculation has a first input, A, and a first output, B, wherein the second type of calculation has a second output, C, and wherein the second type of calculation comprises at least one of:
   a. regulating the second output, C, such that a codec mode position requested by the third node in the second type of information approaches a given codec mode position;
   b. decreasing the second output, C, by a power step when a codec mode position requested by the third node in the second type of information is larger than a currently used codec mode position by the third node;
   c. decreasing the second output, C, by a power step when a codec mode position requested by the third node is larger than or equal to the currently used codec mode position by the third node, wherein the requested codec mode position is different than 1;
   d. increasing the second output, C, by a power step when a codec mode position requested by the third node is lower than a currently used codec mode position by the third node;
   e. decreasing the second output, C, by a power step when a codec mode position requested by the third node is equal to a highest codec mode position in an active codec mode set in the third node, wherein the requested codec mode position is different than 1.

11. The method of claim 1, wherein the determining the transmission power is further based on a minimum power limit and a maximum power limit.

12. The method of claim 1, wherein the second type of calculation comprises usage of a dummy codec.

13. Computer program, comprising instructions which, when executed on at least one processor, cause the at least one processor to carry out the method according to claim 1.

14. A computer-readable storage medium, having stored thereon a computer program, comprising instructions which, when executed on at least one processor, cause the at least one processor to carry out the method according to claim 1.

15. A first node configured to control a transmission power of a second node, wherein the first node and the second node are configured to operate in a wireless communications network, the first node being further configured to:
   determine whether a measurement report has been received by the first node during a first time period from a third node, wherein the measurement report comprises a first type of information, related to a quality of a radio channel, which radio channel is configured to be established between the third node and the second node during a second time period,
   determine a transmission power for the second node, wherein:
      when the measurement report has been received, to determine the transmission power is configured to be based on a first type of calculation for determining the transmission power and a second type of calculation for determining the transmission power, wherein the first type of calculation is based on the received measurement report, and wherein the second type of calculation is based on a second type of information related to the quality of the radio channel configured to be established between the third node and the second node during a third time period, wherein the third time period is a shorter time period than the second time period,
      when the measurement report has not been received, to determine the transmission power is configured to be based on the second type of calculation, and
   configure the second node to use the determined transmission power.

16. The first node of claim 15, wherein the first type of information comprises measurement information, and wherein the second type of information is configured to be obtained by the first node, and comprises an indication of the quality of the radio channel as configured to be perceived by the third node.

17. The first node of claim 15, wherein the second time period is a Slow Associated Control Channel, SACCH, period.

18. The first node of claim 15, wherein the first node is a Base Station Controller, the second node is a Base Transceiver Station and the third node is a wireless device configured to be served by the second node.

19. The first node of claim 15, wherein the second type of calculation is an Adaptive Multi Rate, AMR, power control algorithm, wherein the second type of information is configured to comprise an Uplink Mode Request, and wherein the third time period is two speech frames.

20. The first node of claim 15, wherein the first node is a Base Station Controller the second node is a wireless device, and the third node is a Base Transceiver Station serving the second node, and wherein the second type of calculation is an Adaptive Multi Rate, AMR, power control algorithm, the second type of information is configured to comprise a Downlink Mode Request, and wherein the third time period is two speech frames.

21. The first node of claim 15, wherein the first type of calculation for determining the transmission power has a first input, A, and a first output, B, wherein the second type of calculation for determining the transmission power is based on the second type of information on the quality of the radio channel configured to be established between the third node and the second node during one or more third time periods during the second time period, wherein each second type of calculation for each of the one or more third time periods has a second output, C, and wherein the first input, A, to the first type of calculation is the first type of information and one or a combination of:
 a. one previous output of the first type of calculation or a weighted sum of several previous first type of calculations;
 b. one output of the second type of calculation for one of the one or more third time periods; and
 c. a weighted sum of all second outputs of the second type of calculation performed during the second time period.

22. The first node of claim 15, wherein the first type of calculation has a first output, B, wherein the second type of calculation has a second output, C, and wherein to determine the transmission power based on the first type of calculation and the second type of calculation comprises calculating the transmission power for the second node as a weighted sum of the first output B and the second output C.

23. The first node of claim 15, wherein the second type of calculation is further configured to be based on a last received measurement report, wherein the last received measurement report comprises the first type of information comprising measurement information on the quality of a radio channel configured to be established between the third node and the second node during a fourth time period, wherein the fourth time period is configured to end no later than when the third time period is configured to end.

24. The first node of claim 15, wherein the first type of calculation has a first input, A, and a first output, B, wherein the second type of calculation has a second output, C, and wherein the second type of calculation is configured to comprise at least one of:
 d. regulating the second output, C, such that a codec mode position configured to be requested by the third node in the second type of information approaches a given codec mode position;
 e. decreasing the second output, C, by a power step when a codec mode position configured to be requested by the third node in the second type of information is larger than a codec mode position configured to be currently used by the third node;
 f. decreasing the second output, C, by a power step when a codec mode position configured to be requested by the third node is larger than or equal to the codec mode position configured to be currently used by the third node, wherein the codec mode position configured to be requested is different than 1;
 g. increasing the second output, C, by a power step when a codec mode position configured to be requested by the third node is lower than a codec mode position configured to be currently used by the third node;
 h. decreasing the second output, C, by a power step when a codec mode position configured to be requested by the third node is equal to a highest codec mode position in an active codec mode set in the third node, wherein the codec mode position configured to be requested is different than 1.

25. The first node of claim 15, wherein to determine the transmission power is further configured to be based on a minimum power limit and a maximum power limit.

26. The first node of claim 15, wherein the second type of calculation is configured to comprise usage of a dummy codec.

* * * * *